Sept. 30, 1924.                          1,509,982
A. SCHOENECK ET AL
WHEEL CONSTRUCTION
Filed March 13, 1923
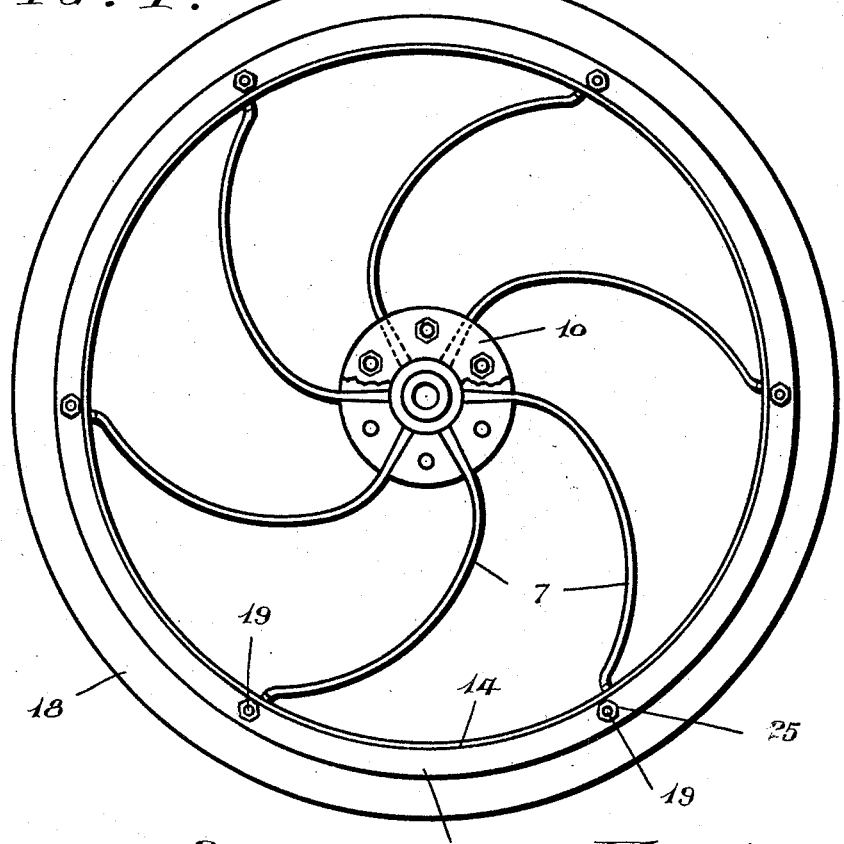
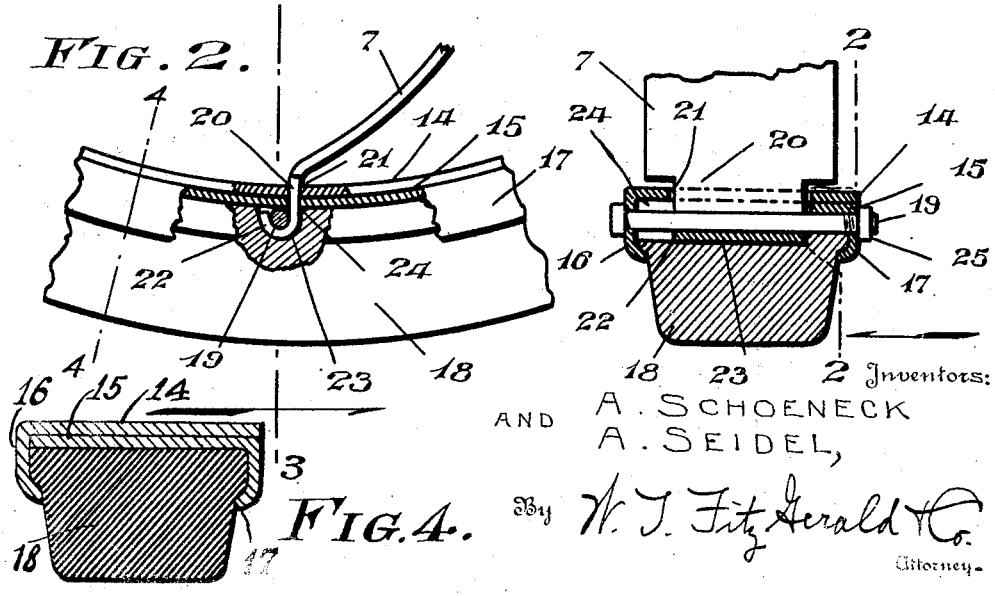
Inventors:
A. SCHOENECK
AND A. SEIDEL,
By W. J. FitzGerald & Co.
Attorney.

Patented Sept. 30, 1924.

1,509,982

UNITED STATES PATENT OFFICE.

ADOLPH SCHOENECK AND AUGUST SEIDEL, OF ENTERPRISE, WISCONSIN.

WHEEL CONSTRUCTION.

Application filed March 13, 1923. Serial No. 624,738.

*To whom it may concern:*

Be it known that we, ADOLPH SCHOENECK and AUGUST SEIDEL, citizens of the United States, residing at Enterprise, in the county of Oneida and State of Wisconsin, have invented certain new and useful Improvements in Wheel Constructions; and we do hereby declare the following to be a full, clear, and exact description of the invention, such as will enable others skilled in the art to which it appertains to make and use the same.

The present invention relates to vehicle wheels having resilient or spring spokes, for the purpose of obtaining a yielding or cushioning action, without the necessity of using pneumatic tires, and the invention has for its object the provision of a novel assembly of the spokes and rim, whereby the parts are securely fastened together, as well as being capable of convenient separation and assembly.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved wheel, a portion of the near hub plate or flange being broken away.

Fig. 2 is a fragmentary elevation, portions being shown in section on the line 2—2 of Fig. 3.

Figs. 3 and 4 are cross sections on the respective lines 3—3 and 4—4 of Fig. 2.

The spokes 7 are curved in the plane of the wheel, and are composed of resilient strips of suitable metal, whereby the spokes can spring for the yielding or cushioning action between the hub and rim.

The inner ends of the spokes are secured to a suitable hub 10.

The rim of the wheel comprises the inner and outer rings or bands 14 and 15 fitted together telescopically, said rings being slid together transversely. Said rings are provided at opposite edges with the outturned tire retaining flanges 16 and 17 for holding a solid rubber tire 18 on the rim between said flanges, and transverse bolts 19 or other suitable securing elements extend transversely through the flanges 16 and 17 across the outer periphery of the rim for holding the rings 14 and 15 together. Said bolts also serve to anchor the outer ends of the spokes to the rim.

The outer ends of the spokes have the portions 20 extending radially outward through transverse slots 21 provided in the ring or inner section 14 of the rim, and said portions are bent to form the hooks 22 engaging partly around the bolts 19, thereby anchoring the spokes to said bolts and rim. The outer hooked terminals of the spokes can be inserted through the slots 21 before the inner ends of the spokes are assembled with the hub, thereby permitting the hooks 22 to be inserted outwardly through the slots 21 by properly positioning and moving the spokes. The inner periphery of the tire 18 has transverse recesses 23 to accommodate the bolts 19 and hooks 22, and the ring or outer rim section 15 has transverse slots 24 through which the portions 20 extend. The slots 24 extend to that edge of the ring 15 opposite to the flange 17 of said ring, to permit the ring 15 to be removed when the nuts or retaining elements 25 of the bolts are removed.

When assembling the parts of the wheel, the hooks 22 are first inserted outwardly through the slots 21 of the ring 14, and the spokes are then assembled with the hub. The tire 18 is fitted on the ring 15, and said ring 15 is then slid on the ring 14, so that the portions 20 enter the slots 24 and the hooks 22 enter the recesses 23. The bolts 19 are then inserted and secured, thereby fastening the parts together.

When it is desired to separate the parts, for replacing the tire, a broken spoke or other part, the nuts 25 are removed from the bolts 19, and the ring 15 and tire 18 can then be readily separated transversely from the ring 14 and spokes. The tire can then be removed from the ring 15. The spokes are also readily detached from the ring 14 by removing the bolts 19 and disconnecting the spokes from the hub to enable the hooks 22 to be withdrawn from the slots 21.

It is also possible to use a pneumatic tire on the felly, and if the pneumatic tire is carried by a demountable rim, suitable provision can be made for securing the rim on the felly according to well known devices for this purpose.

Having thus described the invention, what is claimed as new is:—

1. In a wheel, a rim composed of rings one fitted on the other, said rings having opposite flanges for holding a tire between them, securing elements connecting said flanges, and spokes extending through said rings and anchored to said elements, said rings having slots through which the spokes extend, and the slots of the outermost ring extending to the edge of said ring opposite to the flange of said ring in order that said ring can be removed from the spokes and other ring.

2. In a wheel, a rim composed of rings one fitted on the other, said rings having opposite flanges for holding a tire between them, securing elements connecting said flanges, and spokes engaging said elements, said rings having slots through which the spokes extend, and the slots of one ring extending to one edge of the ring in order that said ring can be removed from the spokes and other ring.

In testimony whereof we have signed our names to this specification in the presence of two subscribing witnesses.

ADOLPH SCHOENECK.
AUGUST SEIDEL.

Witnesses:
  Geo. H. Bauer,
  Mrs. L. S. Parker.